United States Patent
Kim et al.

(10) Patent No.: US 9,942,879 B2
(45) Date of Patent: Apr. 10, 2018

(54) METHOD AND APPARATUS FOR AVOIDING RESOURCE COLLISION IN MOBILE COMMUNICATION SYSTEM

(71) Applicant: Samsung Electronics Co., Ltd, Gyeonggi-do (KR)

(72) Inventors: Kyung-Kyu Kim, Suwon-si, Gyeonggi-do (KR); Seung-Hoon Park, Seoul (KR); Young-Bin Chang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 14/716,440

(22) Filed: May 19, 2015

(65) Prior Publication Data
US 2015/0334721 A1    Nov. 19, 2015

(30) Foreign Application Priority Data

May 19, 2014 (KR) .................. 10-2014-0059939
Nov. 25, 2014 (KR) .................. 10-2014-0165244

(51) Int. Cl.
*H04W 4/00* (2009.01)
*H04W 72/02* (2009.01)
*H04W 72/08* (2009.01)
*H04W 76/02* (2009.01)

(52) U.S. Cl.
CPC ......... *H04W 72/02* (2013.01); *H04W 72/085* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 2011/0268101 A1* | 11/2011 | Wang | H04L 5/0053 370/344 |
| 2012/0163235 A1* | 6/2012 | Ho | H04W 76/023 370/254 |
| 2015/0271846 A1* | 9/2015 | Kowalski | H04W 72/14 370/329 |

* cited by examiner

*Primary Examiner* — Minh-Trang Nguyen

(57) ABSTRACT

Different resources are selected based on QoS, emergency class, location, and SA count. A method for avoiding resource collision by a first User Equipment (UE) in a mobile communication system is provided. The method includes listening to Scheduling Assign (SA) information of a second UE; and selecting different resources between UEs based on the SA information.

22 Claims, 11 Drawing Sheets

METHOD AND APPARATUS FOR AVOIDING RESOURCE COLLISION IN MOBILE COMMUNICATION SYSTEM

CROSS-REFERENCE TO RELATED APPLICATION AND CLAIM OF PRIORITY

The present application is related to and claims benefit under 35 U.S.C. § 119(a) to Korean Application Serial No. 10-2014-0059939, which was filed in the Korean Intellectual Property Office on May 19, 2014, and to Korean Application Serial No. 10-2014-0165244, which was filed in the Korean Intellectual Property Office on Nov. 25, 2014, the entire content of each application is hereby incorporated by reference.

TECHNICAL FIELD

The present disclosure relates to a method and apparatus for avoiding resource collision in a mobile communication system.

BACKGROUND

Recently, with the spread of wireless devices supporting wireless data communication, such as smart phones, the efficient use of wireless resources has become a technical issue as well as a social issue. Among the technologies that reflect the demand, Device-to-Device (D2D) communication that performs direct communication between wireless device users without going through the evolved Node B (eNB) (or a base station) and the network has attracted much attention.

D2D communication that is performed in the wireless network may not only increase the efficiency of the wireless resources, but also reduce the power consumption of the devices and the network, and expand the service area (or the coverage) of the wireless network. In addition, D2D communication can efficiently distribute the load of the eNB due to the support of mass content, using the proximity of the devices.

The D2D communication may be spread in the physical application in a variety of ways such as Mobile-to-Mobile (M2M) communication, Machine-to-Machine (M2M) communication, Terminal-to-Terminal (T2T) communication and Peer-to-Peer (P2P) communication.

During Scheduling Assign (SA) resource allocation based on the D2D communication or the communication in the cellular system, competition may take place between D2D terminals (or D2D User Equipments (UEs)). Therefore, there is a need for a scheme of allocating resources so that SA may not collide.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide at least the advantages described below. Accordingly, an aspect of an embodiment of the present disclosure is to provide a method and apparatus for avoiding resource collision to prevent SA collision in a mobile communication system.

In accordance with an aspect of the present disclosure, there is provided a method for avoiding resource collision by a first User Equipment (UE) in a mobile communication system. The method includes listening to Scheduling Assign (SA) information of a second UE; and selecting different resources between UEs based on the SA information.

In accordance with another aspect of the present disclosure, there is provided an apparatus for avoiding resource collision by a first User Equipment (UE) in a mobile communication system. The apparatus includes a controller configured to listen to Scheduling Assign (SA) information of a second UE, and select different resources between UEs based on the SA information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. The following description includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the below-described embodiment of the present disclosure, a wireless network supporting Device-to-Device (D2D) communication will be assumed to be a D2D network. However, the technical configuration proposed in the embodiment of the present disclosure should not be construed to be applied only to the D2D network. In other words, it will be apparent to those of ordinary skill in the art that the technical configuration proposed in the embodiment of the present disclosure may be equally applied to the cellular system supporting D2D communication.

Figure 1:
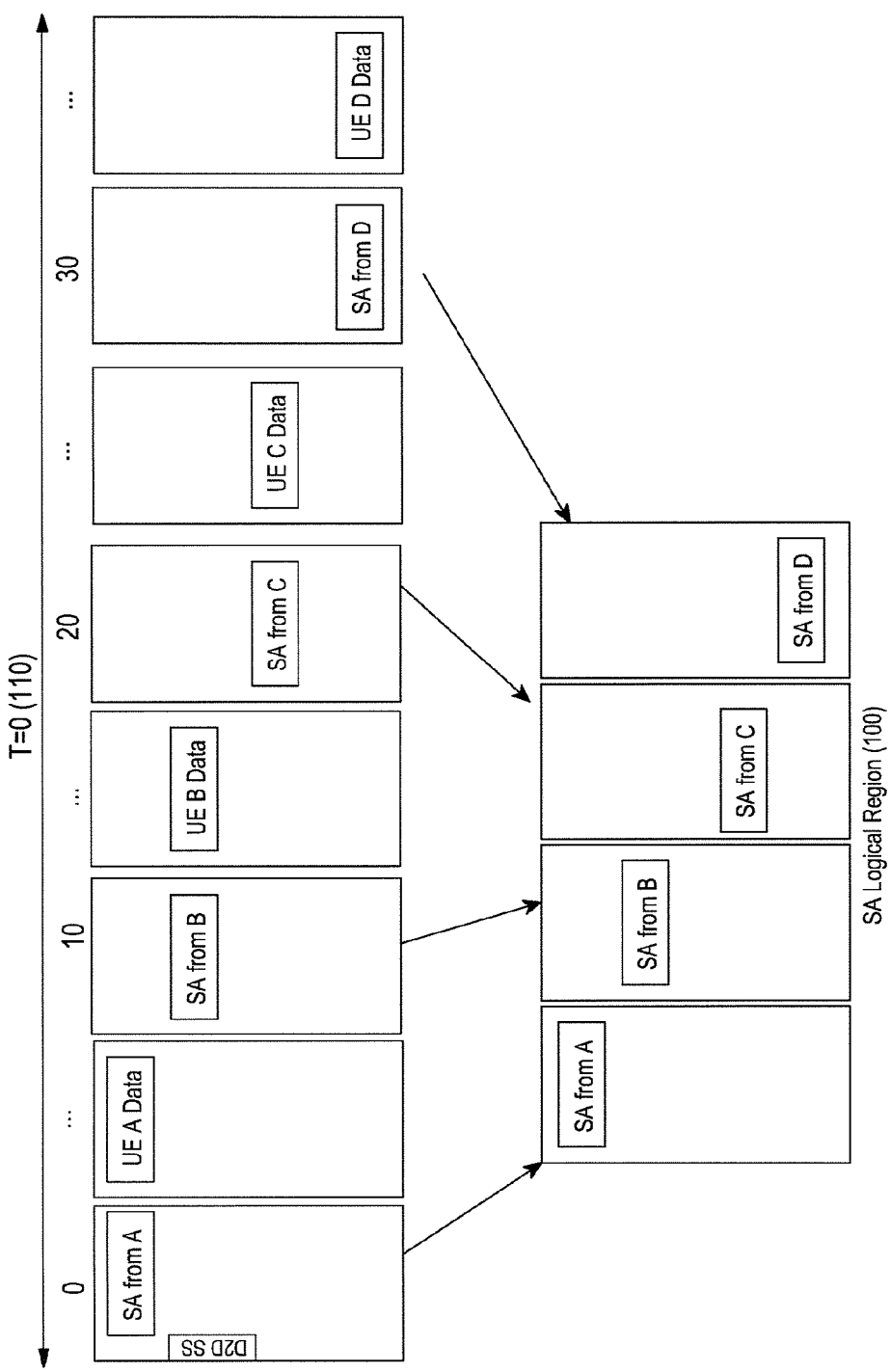
FIG. 1 illustrates a frame structure in D2D communication.

FIG. 1 illustrates a frame structure in D2D communication.

For D2D communication, a User Equipment (UE) may allocate some of uplink resources from an evolved Node B (eNB) as D2D discovery and/or communication resources. The allocated D2D resource region is represented by a cycle of 40 ms 160 ms (e.g., a cycle 110 is 40 ms in FIG. 1). The cycle may include consecutive subframes each having a time of 1 ms. The subframe may include Resource Blocks (RBs) that are divided into the time domain and the frequency domain, and the number of RBs may be determined differently depending on the system.

Among the subframes, a specific subframe may be used as a section for transmitting Scheduling Assign (SA) for D2D communication. The specific subframe will be referred to as an SA transmission section. In the SA transmission section, the UE may broadcast an SA message. The SA message may include a data transmission resource index or pattern that will be used by a UE desiring transmission, and a reception Identifier (ID). The SA transmission section may periodically appear in D2D resources, and as a possible example, assuming that a cycle of the SA transmission section is 10 ms and a cycle of the D2D resource region is 40 ms, there may exist 4 SA transmission regions 100. The 4 SA transmission regions 100 may be an SA logical region, which may be divided into several physical SA regions. The UE may broadcast the UE's own SA message in one of the SA transmission sections, and listen to the remaining SA transmission sections. The transmitted SA message may be valid during one cycle of the D2D resource region. The remaining subframes except for the SA transmission sections may transmit D2D data. As another possible example, the remaining subframes except for the SA transmission sections may transmit data for communication.

Figure 2:
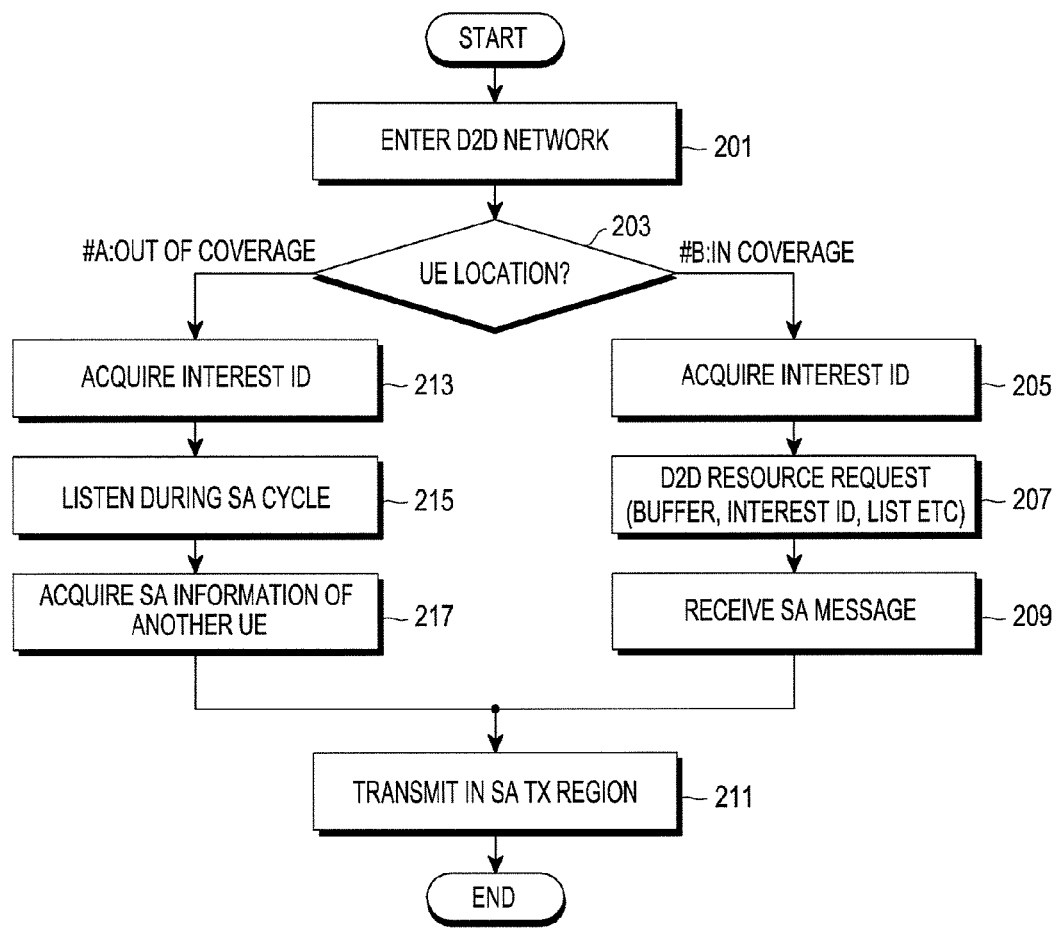
FIG. 2 is a flowchart illustrating a method for transmitting group information in a mobile communication system according to an embodiment of the present disclosure.

FIG. 2 is a flowchart illustrating a method for avoiding resource collision in a mobile communication system according to an embodiment of the present disclosure. Reference will be made to FIG. 2 to describe how a UE acquires information about another UE.

An SA message according to an embodiment of the present disclosure may include an Interest ID, in order to avoid the half-duplexing problem and the SA collision. The Interest ID may include a group and/or individual ID that a UE or a user desires to listen to. The group/individual ID may be an ID of an application area or a Medium Access Control (MAC) area. The Interest ID may include Interest ID's own group or a group of another person, and if there is a change in Interest ID, the changed Interest ID may be applied, starting from the next SA. A method for acquiring the Interest ID may include, as an example, a method in which the Interest ID belongs to a UE or a user and is first pre-configured. In this case, when the UE is manufactured or subscribed to the service provider, the UE should be configured to have IDs of all groups that use the service, in the form of a codebook or in a similar form. As another example, there is a method for acquiring an ID of the interest group or individual with the help of the network. For the first group and individual, the group information may be registered in the server and the ID may be acquired, when the group and individual subscribe to the network. Thereafter, if an arbitrary UE or individual desires to obtain an ID of the UE's desired group, the UE may send a request for requesting an Interest ID to the server located in the network, using the name of the group, and upon receiving the request message, the server may send a response message including the Interest ID matching the group information stored therein.

Second, the SA message may include a resource pattern or index. Details may be the same as those of FIG. 1.

Third, the SA message may include the priority information of the UE or subscriber, and the Quality of Service (QoS) class of the data that the UE or subscriber desires to transmit. The priority of the UE or subscriber may be represented by the number of 0 to X, and may have a different range depending on the system. If the priority of the UE or subscriber is high, the UE or subscriber may have the priority in transmission. In other words, even the UEs desiring to use the same transmission resources may avoid the transmission resources or abandon the transmission depending on the priority. As for QoS of transmission data, if the UE desires transmission of data susceptible to delay, such as video/voice, the UE may have high priority. The priority and data QoS of the UE or subscriber may be transmitted as a separate data file in the present disclosure, but if necessary, they may be transmitted in a combination of two values.

Fourth, the SA message may include a location value.

Referring to FIG. 2, in operation 201, the UE may enter the D2D network. In operation 203, the UE may determine whether the UE is an in-coverage UE or an out-of-coverage UE.

In the case of the UE's location, in an embodiment of the present disclosure, the coverage (or transmission range) of the eNB may be classified into 'in coverage' and 'out of coverage'. The classification may be further subdivided depending on the system. In the case of the in-coverage UE, the UE may obtain an Interest ID in operation 205. When desiring D2D data transmission, the UE may send a resource allocation request including the amount of data to be transmitted, an Interest ID, an Interest ID list, the amount of a buffer and the like, to the eNB in operation 207. Thereafter, if the eNB generates an SA message based on the amount of data, the Interest ID, the Interest ID list, the amount of a buffer and the like, the UE may receive the SA message generated by the eNB, in operation 209. The UE may obtain the UE's own resource information through the SA message generated by the eNB. Therefore, the in-coverage UE may receive information about the transmission location of SA from the eNB, and the transmission location information may include the index and cycle by which the UE will transmit data depending on the resource allocation method. Upon receiving the SA message, the UE may transmit the contents in the SA transmission region in operation 211.

On the other hand, in the case of the out-of-coverage UE, the UE may obtain an Interest ID in operation 213. Thereafter, in operation 215, the UE may listen to SA from the surrounding for a predetermined time. In operation 217, the UE may acquire SA information of another UE. Thereafter, in operation 211, the UE may spontaneously determine the transmission location and the data transmission index, and transmit the determination result in the SA transmission region.

Finally, the SA message may include an SA Count.

The SA Count represents the remaining number of times that the transmission UE will transmit SA in the D2D cycle in the future, and if SA transmission is completed, the SA Count may be decreased by one. If SA Count is zero (0), SA may no longer be transmitted and may not occupy resources. Another UE may more accurately predict the empty resources in the next cycle, using the SA Count.

In summary, the SA message may include at least one of (1) Interest ID, (2) resource pattern or index, priority information of a UE or subscriber, and QoS class of data to be transmitted, (3) location value, and (4) SA Count.

Figure 3:
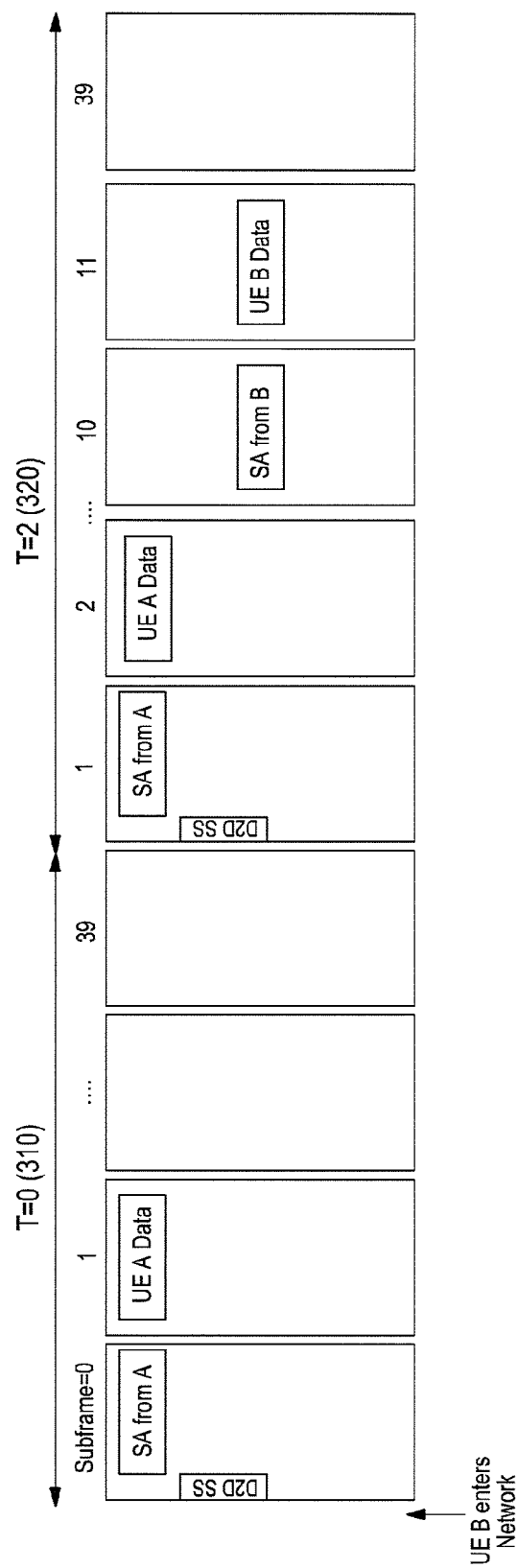
FIG. 3 illustrates a subframe structure for avoiding resource collision in a mobile communication system according to an embodiment of the present disclosure.

FIG. 3 illustrates a subframe structure for avoiding resource collision in a mobile communication system according to an embodiment of the present disclosure.

Referring to FIG. 3, a UE A is occupying resources in the current cycle T0 310, and so, the UE A may broadcast the UE A's own SA in an SA transmission section (or a first subframe), to deliver information included in the SA message described in FIG. 2 to the UE A's nearby UEs. At this time, if a UE B has first entered the D2D network in the cycle T0 310, and is an in-coverage UE, the UE B may be allocated SA by allocation of the eNB.

On the other hand, if the UE B is an out-of-coverage UE, the UE B may perform an avoidance operation for minimizing the half-duplexing problem and the SA collision. First, the UE B may listen to all of SAs for a predetermined cycle to acquire SA information of the UE B's nearby UEs. As a possible example, the UE B may acquire SA information through SA that the UE A has transmitted in the cycle T0 310. Thereafter, the UE B may first check the user priority to classify a top-priority communicable UE. For example, if a user priority of the UE A is higher than that of the highest class or the UE B, the UE B may select resources orthogonal with the resource region that includes SA and data used by the UE A.

On the other hand, if the user priority of the UE A is equal to or lower than that of the normal class or the UE B, the UE B may check an Interest ID of the UE A. After checking the Interest ID of the UE A, the UE B may compare the checked Interest ID with the UE B's own Interest ID.

If the Interest ID of the UE A includes an ID of the UE A or an ID of a group to which the UE A belongs, or if the Interest ID of the UE B does not include an ID of a group of the UE A, the UE B may select resources regardless of the UE A. As an exception, as for a coverage priority of the UE A, if the UE A is an in-coverage UE and the UE B is an out-of-coverage UE, the UE B may select resources in a way to ensure resource orthogonality of the UE A if possible. On the other hand, if the interest groups match each other, the UE B may check SA Count of the UE A.

If SA Count is 0, i.e., if the UE A no longer transmits SA and data in the next cycle T1 320, the UE B may select the UE B's own resources without considering resources of the UE A. On the other hand, if SA Count is not 0, it means that the UE A transmits SA and data in the same resource location even in the next cycle. So, when all of the above conditions are satisfied, the UE B may select the UE B's own resources in consideration of the resource location of the UE A.

First, the UE B may determine whether there are resources orthogonal with the UE A in the SA transmission section and D2D data transmission section in D2D resources. If there are resources capable of time orthogonal, the UE B may select the resources, allowing the UE A that has transmitted SA to listen to the UE A's own SA and data. On the other hand, if there are inevitably no resources capable of orthogonal, the UE B may determine QoS of the data transmitted by the UE A.

If QoS of the data transmitted by the UE A is higher than QoS of the data to be transmitted by the UE B, the UE B may determine whether a delay of the UE B's own data transmission is possible. As an example, since a delay requirement exists for each QoS class for each data and there is a cycle in the D2D resource transmission, the UE B may compare the delay requirement with the resource transmission cycle, and depending on whether the delay requirement is satisfied, the UE B may determine whether a delay of the UE B's own data transmission is possible. If the transmission delay is possible, the UE B may attempt again the transmission in the next cycle without performing the transmission in this D2D transmission cycle. On the other hand, if the transmission delay is impossible, the UE B may inevitably select resources without considering the UE A.

Although two UEs have been considered in the above examples, the same method may be used even when transmission resources are selected in consideration of a plurality of UEs.

Figure 4:
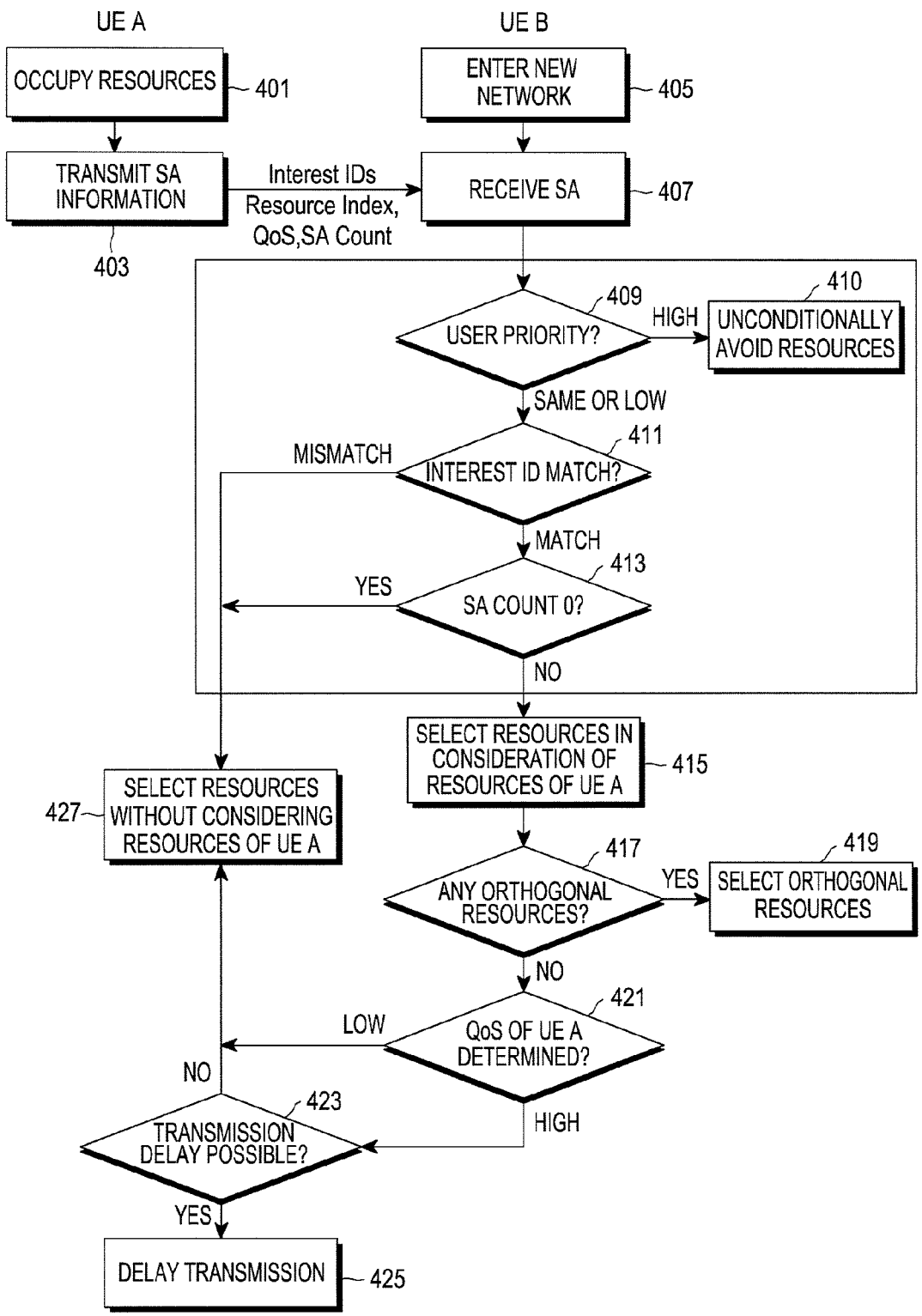
FIG. 4 is a flowchart illustrating a method for avoiding resource collision in a mobile communication system according to an embodiment of the present disclosure.

FIG. 4 is a flowchart illustrating a method for avoiding resource collision in a mobile communication system according to the embodiment discussed above with regard to FIG. 3 of the present disclosure.

Referring to FIG. 4, in operation 401, a UE A is presently occupying resources. In this situation, it will be assumed that the UE A, which an in-coverage UE, is broadcasting SA by receiving the SA from the eNB in operation 403 and a UE B, which is an out-of-coverage UE, has first entered the D2D network in operation 405.

In addition, it will be assumed that the UE B overlaps the UE A in terms of the coverage as the UE B moves in the outside of the coverage. Therefore, the UE A and the UE B may broadcast their own SA in the SA transmission section to deliver the SA information described in FIG. 2 to their nearby UEs. However, the UE A and the UE B may not determine the presence of each other, as the UE A and the UE B transmit the SA in the same SA transmission section.

The UE A and the UE B may take other actions depending on the coverage parameter, i.e., the location of the UE. If the UE is located out of the coverage (e.g., the UE indicates the UE B in FIG. 3), the UE may set up a listen section proposed in the present disclosure. The listen section may be defined as a section in which the UE listens to SA of another UE, without sending the UE's own SA and the data if necessary. The setup of the listen section may be first determined by a probability value, and may be determined in every D2D cycle. The probability may be determined based on the QoS class and requirement of the data that the UE itself sends. If the QoS requirement is high, there is an increase in probability that the UE B will set up a listen section in the next D2D transmission cycle. On the contrary, if the QoS requirement is low, there is a decrease in probability that the UE B will set up a listen section in the next D2D transmission cycle. For example, if the UE B is not changed (or switched) to a listen mode in the next cycle after first transmitting SA and D2D data, there is an increase in probability that the UE B will be changed to the listen mode in the next cycle T2. The probability of changing to the listen mode may increase until the listen mode is triggered. If the UE B is changed to the listen mode, the probability of changing to the listen mode may be initialized.

On the other hand, the in-coverage UE may not use the listen mode. In other words, systematically, since the in-coverage UE should be controlled by the eNB, the in-coverage UE does not move in principle. However, the in-coverage UE may move depending on the situation.

Therefore, the UE B that has re-listened to the surrounding SA by setup the listen mode of the UE B may acquire SA information of the nearby UEs once again in operation 407.

As an example, the UE B may acquire SA information through the SA that the UE A has transmitted in the T1 cycle. Thereafter, in operation 409, the UE B may first check the user priority to classify a top-priority communicable UE. For example, if a user priority of the UE A is higher than that of the highest class or the UE B, the UE B may select resources orthogonal with the resource region that includes SA and data used by the UE A, in operation 410. On the other hand, if the user priority of the UE A is equal to or lower than that of the normal class or the UE B, the UE B may check an Interest ID of the UE A in operation 411. After checking the Interest ID of the UE A, the UE B may compare the checked Interest ID with the UE B's own Interest ID. If the Interest ID of the UE A includes an ID of the UE A or an ID of a group to which the UE A belongs, or if the Interest ID of the UE B does not include an ID of a group of the UE A, the UE B may select resources regardless of the UE A in operation 427. As an exception, as for a coverage priority of the UE A, if the UE A is an in-coverage UE and the UE B is an out-of-coverage UE, the UE B may select resources in a way to ensure resource orthogonality of the UE A if possible. On the other hand, if the interest groups match each other, the UE B may check SA Count of the UE A in operation 413.

If SA Count is 0, i.e., if the UE A no longer transmits SA and data in the next cycle, the UE B may select the UE B's own resources without considering resources of the UE A in operation 427. However, if SA Count is not 0, it means that the UE A transmits SA and data in the same resource location even in the next cycle. So, when all of the above conditions are satisfied, the UE B may select the UE B's own resources in consideration of the resource location of the UE A, in operation 415.

First, the UE B may determine in operation 417 whether there are resources orthogonal with the UE A in the SA transmission section and D2D data transmission section in D2D resources. If there are resources capable of time orthogonal, the UE B may select the resources in operation 419, allowing the UE A that has transmitted SA to listen to the UE A's own SA and data. On the other hand, if there are inevitably no resources capable of orthogonal, the UE B may determine QoS of the data transmitted by the UE A in operation 421. If QoS of the data transmitted by the UE A is higher than QoS of the data to be transmitted by the UE B, the UE B may determine in operation 423 whether a delay of the UE B's own data transmission is possible. As an example, since a delay requirement exists for each QoS class for each data and there is a cycle in the D2D resource transmission, the UE B may compare the delay requirement with the resource transmission cycle, and depending on whether the delay requirement is satisfied, the UE B may determine whether a delay of the UE B's own data transmission is possible. If the transmission delay is possible, the UE B may attempt again the transmission in the next cycle without performing the transmission in this D2D transmission cycle, in operation 425. On the other hand, if the transmission delay is impossible, the UE B may inevitably select resources without considering the UE A, in operation 427.

Although two UEs have been considered in the above examples, the same method may be used even when transmission resources are selected in consideration of a plurality of UEs.

Although operations 409, 411 and 413 have been described in an 'AND' operation, they may be implemented even in an 'OR' operation.

Figure 5:
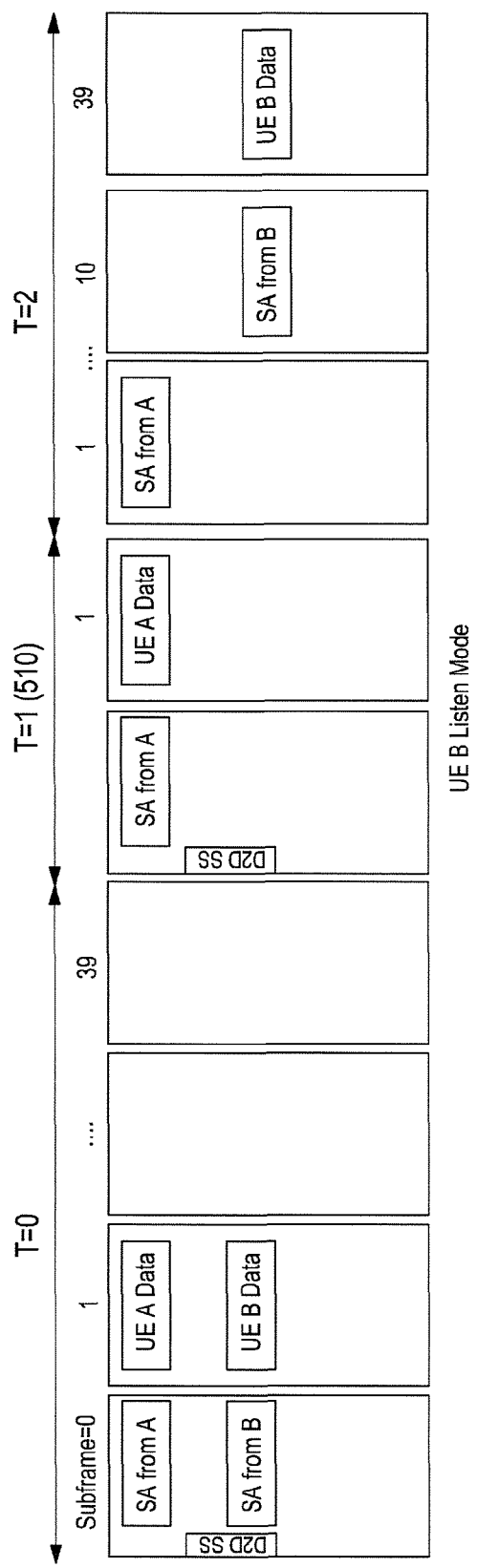
FIGS. 5 and 6 illustrate a method and a subframe structure for avoiding resource collision in a mobile communication system according to an embodiment of the present disclosure.
Figure 6:
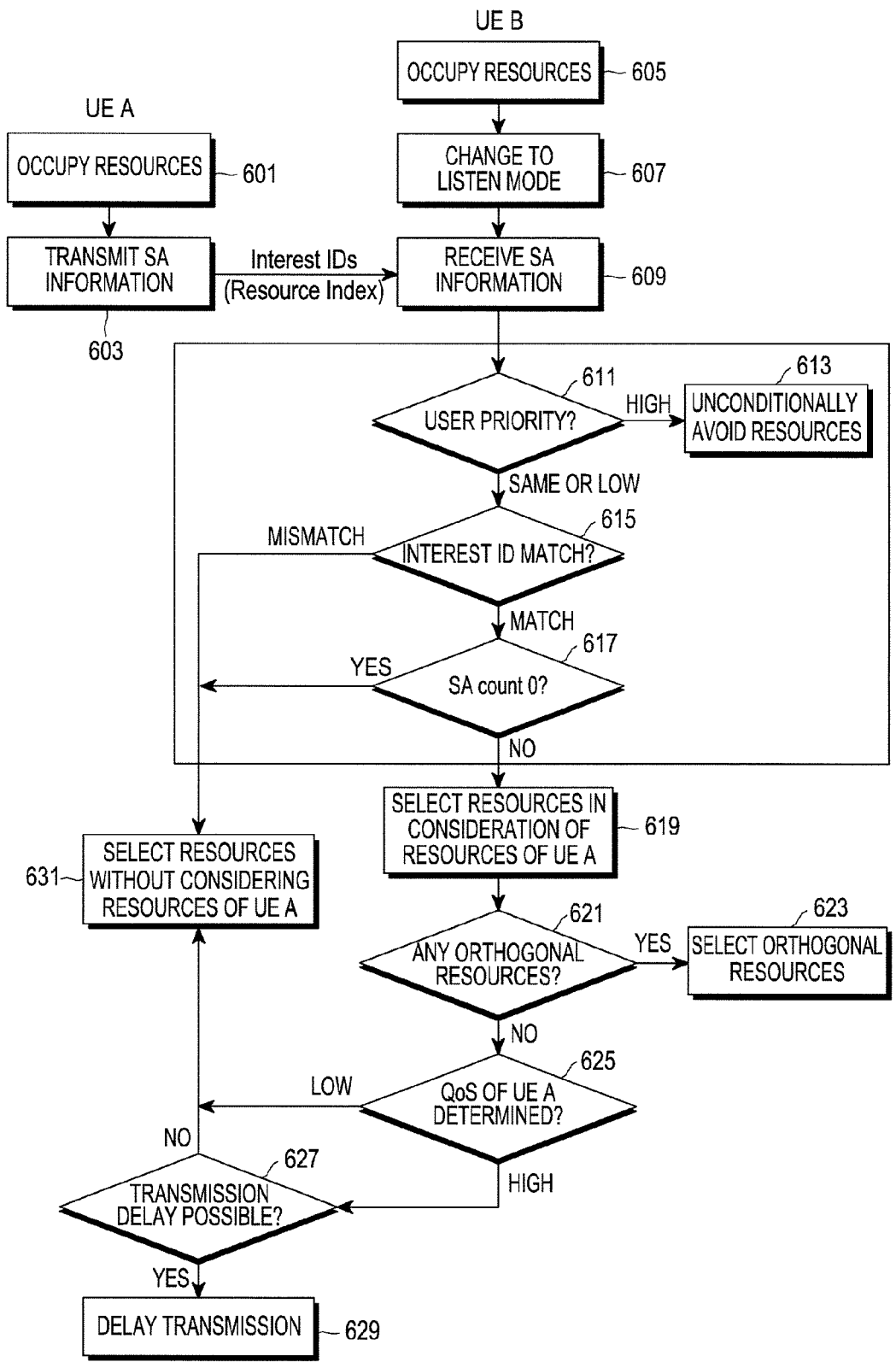

FIGS. 5 and 6 illustrate a method and a subframe structure for avoiding resource collision in a mobile communication system according to an embodiment of the present disclosure.

FIGS. 5 and 6 illustrate an example of a method for changing to different resources depending on the given condition based on group information between UEs that have already occupied resources.

Referring to FIGS. 5 and 6, since a UE A and a UE B are presently occupying resources and the UE B is an out-of-coverage UE, changing to the listen mode in a T1 cycle 510 is different from that in FIGS. 3 and 4, and the remaining operation is the same, so a detailed description will be omitted (i.e., operation 405 in FIG. 4, and operations 605 and 607 in FIG. 6 are different).

Although operations 611, 615 and 617 in FIG. 6 have been described in an 'AND' operation, they may be implemented even in an 'OR' operation.

In an embodiment of the present disclosure, a UE may listen to SA information of anther UE and select different resources between UEs based on the SA information. In an embodiment of the present disclosure, it is possible to select different resources not only in the time domain but also in the frequency domain.

Figure 7:
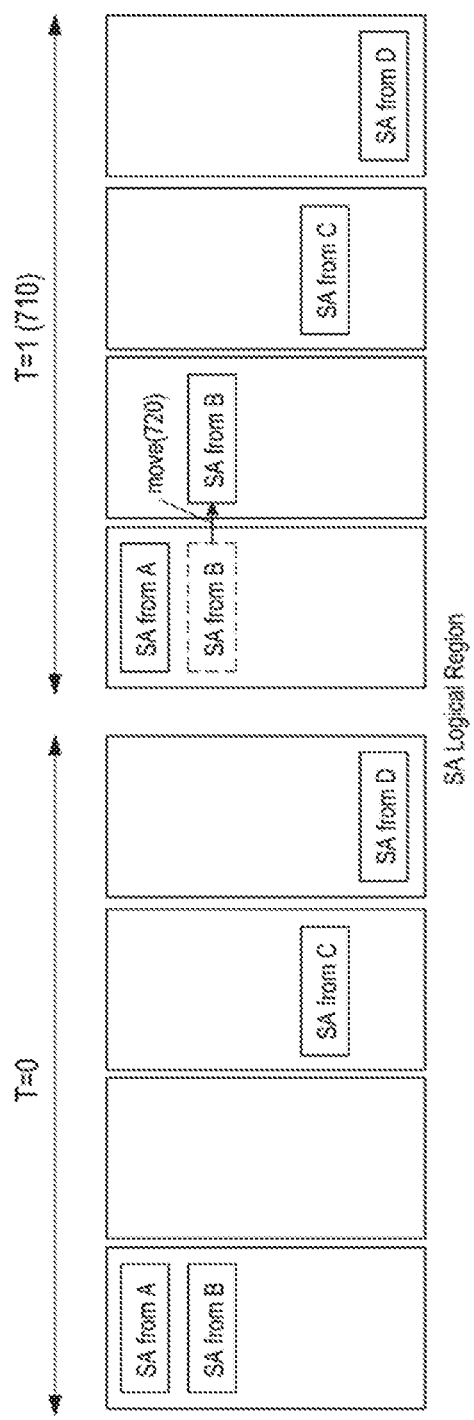
FIGS. 7 and 8 illustrate a method and a subframe structure for avoiding resource collision in a mobile communication system according to an embodiment of the present disclosure.
Figure 8:
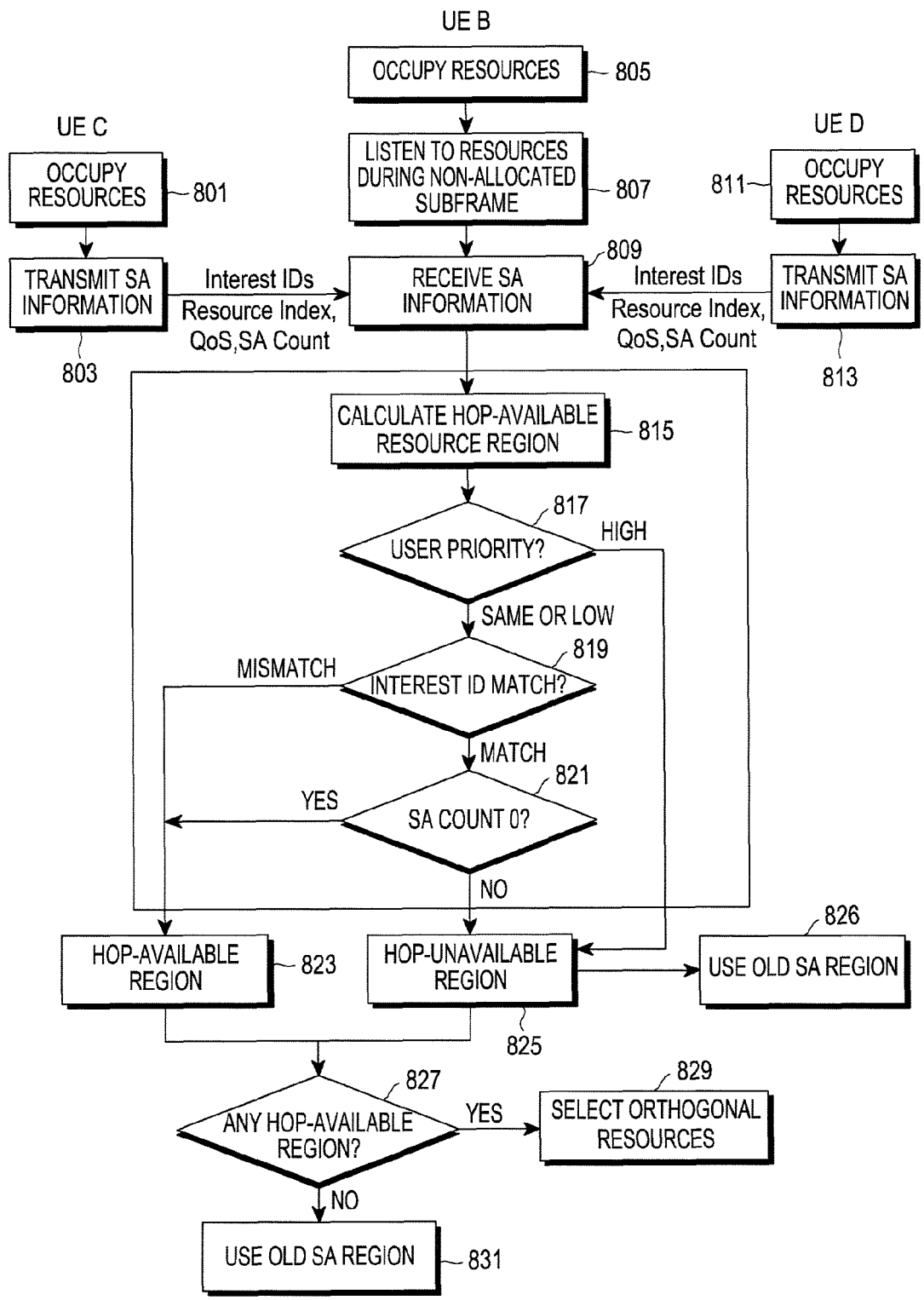

FIGS. 7 and 8 illustrate a method and a subframe structure for avoiding resource collision in a mobile communication system according to an embodiment of the present disclosure.

FIGS. 7 and 8 illustrate another example of a method for changing to different resources depending on the given condition based on group information between UEs that have already occupied resources.

Referring to FIGS. 7 and 8, a UE C, a UE B and a UE D are presently occupying resources in operations 801, 805 and 811. In this situation, it will be assumed that the UE C, which an in-coverage UE, is broadcasting SA by receiving the SA from the eNB in operation 803 and the UE B, which is an out-of-coverage UE, overlaps the UE C in terms of the coverage as the UE B moves in the outside of the coverage as shown by reference numeral 720. Therefore, the UE C and the UE B may broadcast their own SA in the SA transmission section to deliver the SA information described in FIG. 2 to their nearby UEs. However, the UE C and the UE B may not determine the presence of each other, as the UE C and the UE B transmit the SA in the same SA transmission section.

The UE C and the UE B may take other actions depending on the coverage parameter, i.e., the location of the UE. If the UE is located out of the coverage (e.g., the UE indicates the UE B in FIGS. 7 and 8), the UE B may set up intelligent resource hopping proposed in the present disclosure. The intelligent resource hopping means that, assuming that a region for transmitting a UE's own SA will collide in the time domain, the UE may listen to an SA message in the remaining SA cycle except for the SA region that the UE itself has transmitted during one D2D cycle to change the SA transmission section referring to the SA message that the UE listens to in the next cycle.

First, the UE B may listen to resources during a non-allocated subframe in operation 807. The UE B that has broadcasted an SA message in a subframe #1 may acquire SA information of the UE C and the UE D that have listened to SA in subframes of the remaining SA transmission sections 11, 21 and 31 in operation 809. The UE B may calculate a hop-available resource region in operation 815. The hop-available resource region may be determined in the following manner.

The UE B may first determine a user priority in operation 817, to classify a top-priority communicable UE. For example, if a user priority of the UE C is higher than that of the highest class or the UE B, the UE B may not hop to the resource region including SA and data used by the UE C in operation 825, determining the resource region as a hop-unavailable region. On the other hand, if user priorities of the UE C and the UE D are equal to or lower than that of the normal class or the UE B, the UE B may check Interest IDs of the UE C and the UE D in operation 819. After checking the Interest IDs of the UE C and the UE D, the UE B may compare the checked Interest IDs with the UE B's own Interest ID. If the Interest IDs of the UE C and the UE D include IDs of the UE C and the UE D or an ID of a group to which the UE C and the UE D belongs, or if the Interest ID of the UE B does not include an ID of a group of the UE C and the UE D, the UE B may determine even the resource regions of the UE C and the UE D as a hop-available resource region. If the interest groups match each other, the UE B may check SA Counts of the UE C and the UE D in operation 821. If SA Count is 0, i.e., if the UE C no longer transmits SA and data in the next cycle T1 710, the UE B may consider the resource regions of the UE C and the UE D as a hop-available resource region in operation 823. On the other hand, if SA Count is not 0, the UE B may determine the resource region as a hop-unavailable region in operation 825.

Therefore, in the T1 cycle 710, the UE B may exclude the a subframe #1 that the UE B has transmitted, and then determine in operation 827 whether there is a hop-available resource region occupied by the UE C and the UE D.

If it is determined in operation 827 that there is a hop-available resource region, the UE B may randomly select one of the hop-available regions in operation 829, and broadcast the SA to the selected region.

On the other hand, if it is determined in operation 827 that there are inevitably no hop-available resources, the UE B may transmit the SA in the resource region where the UE B has originally broadcasted the SA, without attempting hopping, in operation 831.

On the other hand, an in-coverage UE may not use the intelligent resource hopping. In other words, systematically, since the in-coverage UE should be controlled by the eNB, the in-coverage UE does not move in principle.

Although operations 817, 819 and 821 have been described in an 'AND' operation, they may be implemented even in an 'OR' operation.

Figure 9:
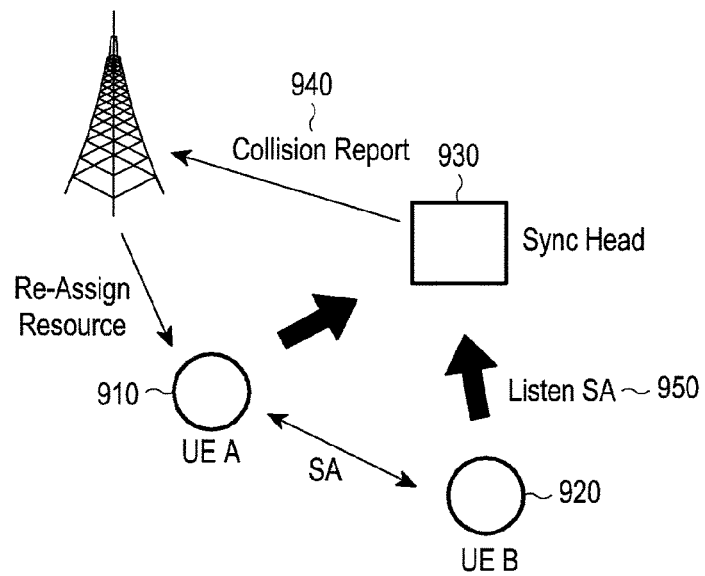
FIG. 9 illustrates a method for avoiding resource collision in a mobile communication system according to an embodiment of the present disclosure.

FIG. 9 illustrates a method for avoiding resource collision in a mobile communication system according to an embodiment of the present disclosure.

A UE A 910 and a UE B 920 are D2D UEs desiring data transmission, and the UE A 910 and the UE B 920 may transmit SAs using SA transmission sections, and broadcast D2D data using D2D data transmission sections. At this time, a UE C 930 that is located in the coverage and desires only reception may listen to all of the UE C's surrounding SAs. If so, the UE C 930 may obtain information such as the match/mismatch of Interest ID, the priority of the UE, the coverage, the remaining SA count and the like, by determining SAs of the UE A and the UE B. If the half-duplexing problem occurs as SA is transmitted in the same subframe unfortunately even though the Interest ID matching process of the UE A and the UE B is done, then the UE C 930 may deliver a collision report 940 to the eNB. The eNB may determine the relevant factors and send a Resource Re- Assign message for adjusting SA and data transmission resources, to the UE located in the coverage, i.e., the UE A 910, in the next cycle.

Figure 10:
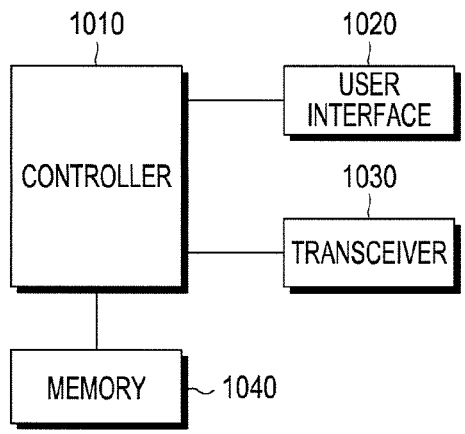
FIG. 10 illustrates a UE's structure for avoiding resource collision in a mobile communication system according to an embodiment of the present disclosure.

FIG. 10 illustrates a UE's structure for avoiding resource collision in a mobile communication system according to an embodiment of the present disclosure.

Referring to FIG. 10, a UE may include a transceiver 1030, a controller 1010, a memory 1040 and a user interface 1020.

The transceiver 1030 may include a transmission module and a reception module for transmitting and receiving data to/from an eNB according to an embodiment of the present disclosure in the mobile communication system. The transceiver 1030 may send a message for requesting resources to the eNB. In an embodiment of the present disclosure, the transceiver 1030 may receive an SA message from the eNB. The SA message may include at least one of (1) Interest ID, (2) resource pattern or index, priority information of a UE or subscriber, and QoS class of data to be transmitted, (3) location value, and (4) SA Count.

The controller 1010 may enable UEs not to select the same resources, based on the information included in the SA message received from the eNB according to an embodiment of the present disclosure.

The memory 1040 may store or extract various data used or required to avoid resource collision according to an embodiment of the present disclosure in the mobile communication system.

The user interface 1020 may deliver the information entered by the user's manipulation to the controller 1010, or provide the necessary information to the user under control of the controller 1010.

Figure 11:
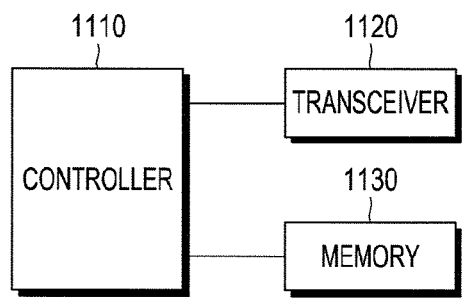
FIG. 11 illustrates an eNB's structure for avoiding resource collision in a mobile communication system according to an embodiment of the present disclosure.

FIG. 11 illustrates an eNB's structure for avoiding resource collision in a mobile communication system according to an embodiment of the present disclosure.

Referring to FIG. 11, an eNB may include a transceiver 1120, a memory 1130 and a controller 1110.

The transceiver 1120 may transmit and receive data to/from a UE to avoid resource collision for the UE according to an embodiment of the present disclosure in the mobile communication system.

The memory 1130 may store or extract various data used or required to avoid resource collision for the UE according to an embodiment of the present disclosure in the mobile communication system.

The controller 1110 may allocate resources by the resource collision avoidance method according to an embodiment of the present disclosure in the mobile communication system.

The method and apparatus according to an embodiment of the present disclosure may be implemented as a computer-readable code stored in a computer-readable recording medium. The computer-readable recording medium may include, but not limited to, all kinds of recording devices in which data is stored that can be read by the computer system. Examples of the recording medium may include Read Only Memory (ROM), Random Access Memory (RAM), Compact Disk Read Only Memory (CD-ROM), magnetic tape, floppy disc, optical data storage device and the like, and may also include transmitting carrier waves over the Internet.

The resource collision avoidance scheme may be applied to, for example, communication between vehicles or between vehicle and infrastructure.

Figure 12:
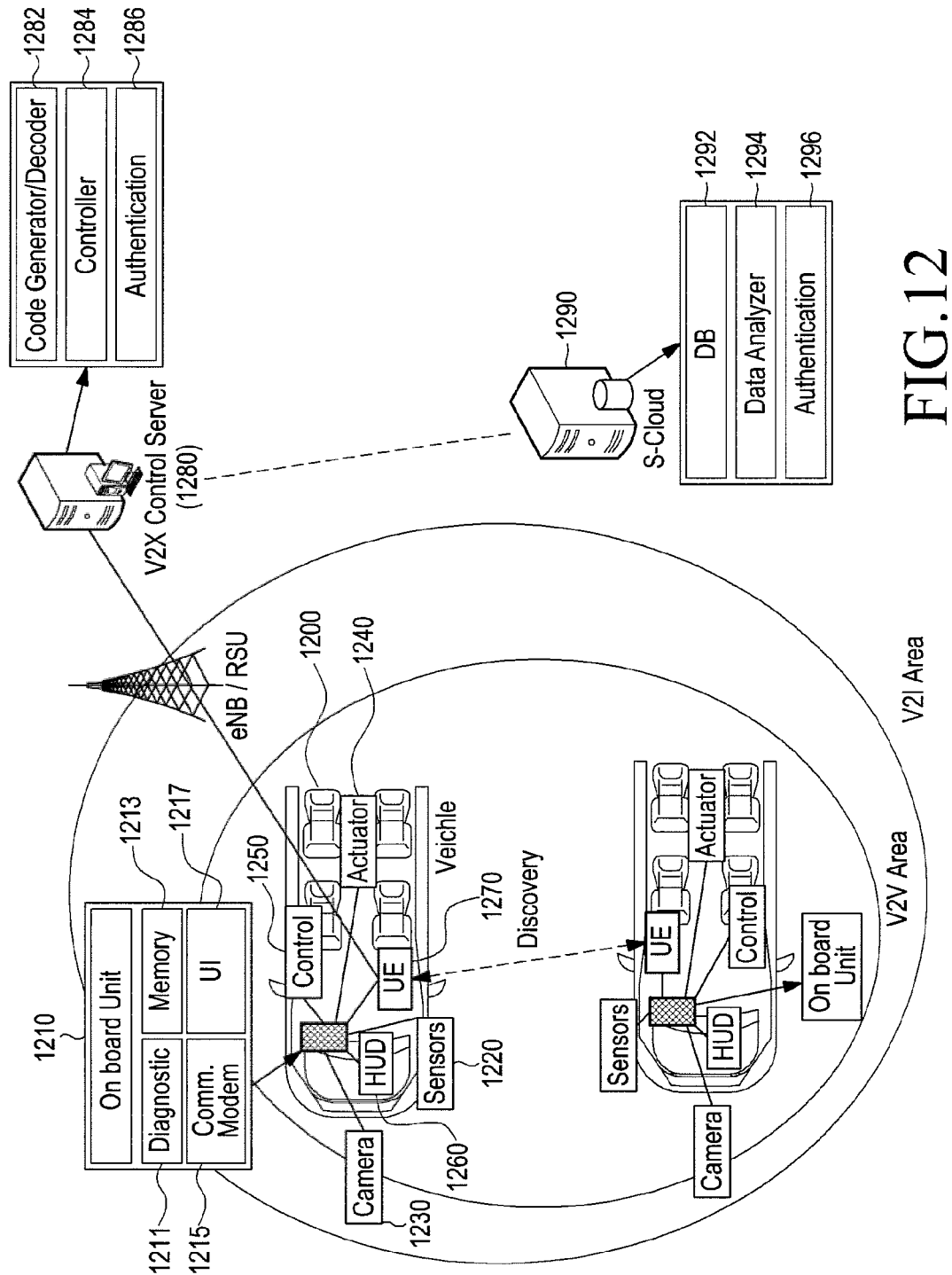
FIG. 12 illustrates communication architecture between vehicles or between vehicle and infrastructure according to an embodiment of the present disclosure.

FIG. 12 illustrates communication architecture between vehicles or between vehicle and infrastructure according to an embodiment of the present disclosure.

First, an on-board unit 1210 may be mounted in the vehicle. The on-board unit 1210 may be connected to various sensors 1220 of the vehicle, a camera 1230, a display (e.g., Head UP Display (HUD) 1260, an actuator 1240, and a controller 1250. For example, the sensors 1220 attached to the vehicle may detect the abnormal situations of the vehicle through periodic status check. For example, the abnormal situations of the vehicle may mean failure of the vehicle, explosion of the air bag, operation of a crash sensor and the like.

The actuator 1240 may detect the acceleration or deceleration situation of the vehicle.

The controller 1250 may serve to deliver information for Vehicle Dynamic Control (VDC) control and differential control to the on-board unit 1210.

The on-board unit 1210 may have an interface by which the on-board unit 1210 can communicate with the various sensors 1220 of the vehicle, the camera 1230, the display 1260, the actuator 1240, and the controller 1250. An example of the interface may include a Controller Area Network (CAN) protocol. The on-board unit 1210 may include a diagnostic module 1211 for analyzing the information received from the sensors 1220 and diagnosing the analysis results, and a memory 1213 for storing the information if necessary. The on-board unit 1210 may include a communication modem module 1215 for performing data communication with the external devices, making it possible to access the network directly or indirectly.

A User Equipment (UE) 1270 may be connected to the network, the cellular base station or the Road Side Unit (RSU), and may be connected to the Wireless Fidelity (Wi-Fi) Access Point (AP), if necessary. A communication area between the UE 1270 and the network, the cellular base station or the RSU will be referred to as a Vehicle-to-Infrastructure (V2I) area. The UE 1270 may be connected to the communication modem module 1215 of the on-board unit 1210, for the UE's communication with the vehicle. Any communication protocol between the UE 1270 and the communication modem module 1215 of the on-board unit 1210 will be good. For example, Long Term Evolution Direct (LTE-D), Bluetooth, Wi-Fi Direct and the like may be used as the communication protocol.

The UE 1270 may serve to help the network connection by the vehicle if necessary, and may enable discovery and communication with a UE of another vehicle. A communication area between UEs in the vehicles will be referred to as a Vehicle-to-Vehicle (V2V) area.

The data generated in the vehicle may be transmitted to a data server (S-Cloud) 1290 by the vehicle directly or via the UE 1270 in the vehicle. The data server 1290 may include a DataBase (DB) 1292, a data analyzer 1294, and an authentication module 1296.

The DB 1292 may index the data generated in the vehicles, gather the data and systematically store the gathered data.

The data analyzer 1294 may classify and analyze the gathered data based on the predetermined criteria.

Finally, the authentication module 1296 may authenticate the user account. The data generated from the vehicle may be separated in units of user accounts through the authentication module 1296, and the data part that is determined to be necessary by the data analyzer 1294 may be processed, and indexed and stored in the DB 1292. Later on, the information may be used for providing information to the vehicle or controlling the vehicle.

A V2X control server (hereinafter, 'control server') 1280 may process and manage the signals used or required to automatically or directly control the vehicle, or to exchange the information. The control server 1280 may include a code generator/decoder 1282, a controller 1284, and an authentication module 1286. The code generator/decoder 1282 may serve to change the information necessary for D2D discovery to a code. The information necessary for D2D discovery may be, for example, fixed information such as the unique ID of the vehicle and emergency stop command. When the vehicle temporarily starts up the engine to start, the code generator/decoder 1282 may receive the necessary information (e.g., temporary information) from the UE 1270 and convert the information into a code, and if the UE 1270 requests code analysis, the code generator/decoder 1282 may analyze the code.

The controller 1284 may be used to control the vehicle directly or indirectly. If necessary, the controller 1284 may determine whether to control the vehicle directly or indirectly, using the information in the data server 1290. Finally, the authentication module 1286 may authenticate a user for each account.

Figure 13:
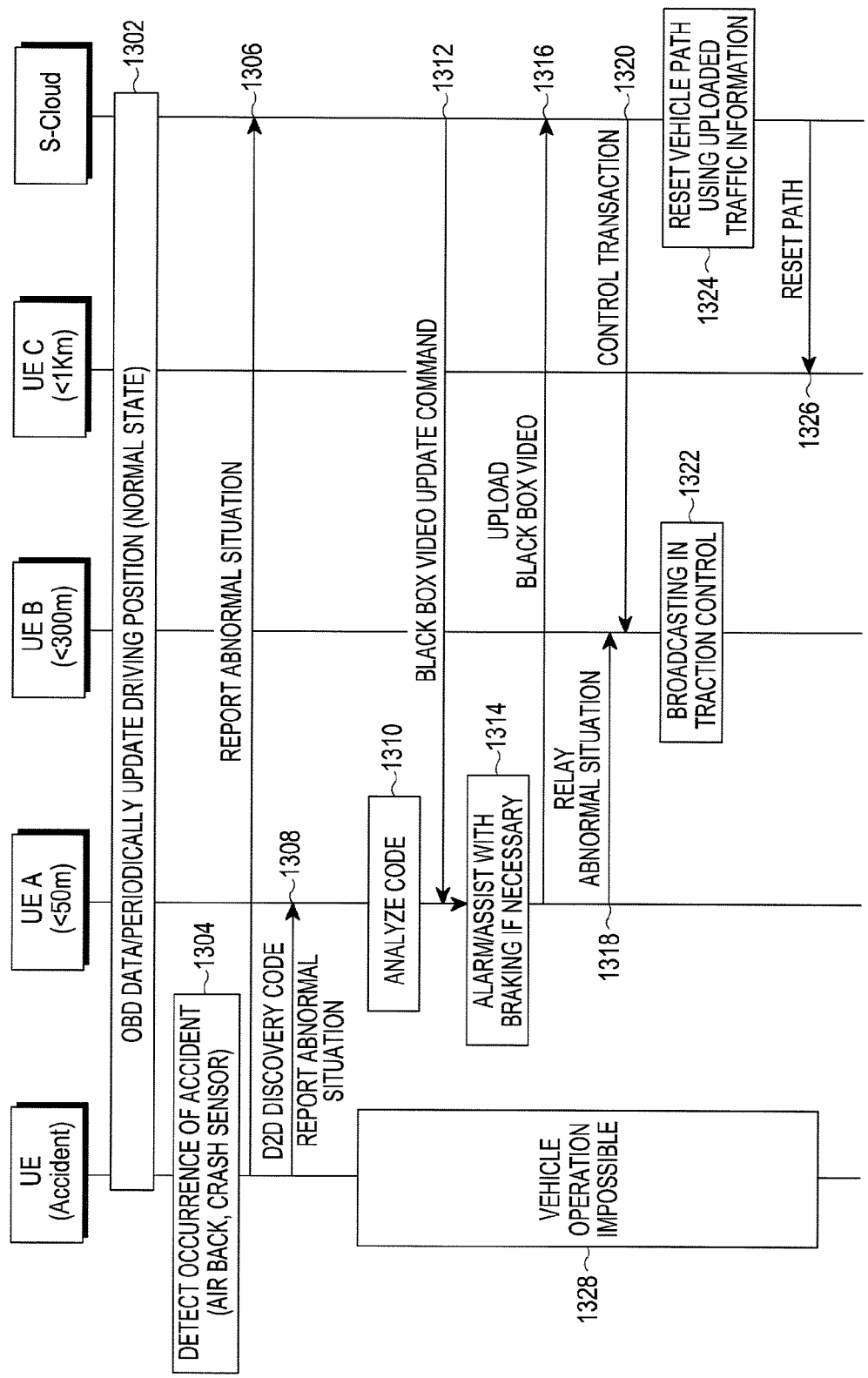
FIG. 13 is a flowchart illustrating a method for preventing a collision between vehicles and delivering distance information according to an embodiment of the present disclosure.

FIG. 13 is a flowchart illustrating a method for preventing a collision between vehicles and delivering distance information according to the embodiment discussed above with regard to FIG. 12 of the present disclosure.

This embodiment is based on the vehicle communication architecture proposed in the present disclosure.

It will be assumed in FIG. 13 that a UE A is a terminal that is located within a distance of, for example, 50 m from a UE; a UE B is a terminal that is located within a distance of, for example, 300 m from the UE; and a UE C is a terminal that is located within a distance of, for example, 1 Km from the UE. In operation 1302, if a UE in the vehicle or the vehicle itself needs driving information that is based on On-Board Diagnostics (OBD) information and Global Positioning System (GPS) information collected by the UE's sensors and camera, the UE or the vehicle may transmit information about nearby vehicles to a data server (S-Cloud) through discovery.

If necessary, an RSU may store discovery information in the data server through discovery with the UE. The data server may determine the location and lane information of the vehicle based on the above information, and express the location and lane information in the map.

If an accident occurs as the vehicle crashes in a certain location, OBD of the UE in the vehicle may determine the accident by collectively analyzing explosion information of the air bag, operation information of the crash sensor on the vehicle bumper, and VDC information, in operation 1304. Upon determining the accident, the UE in the vehicle may deliver or report the abnormal situation to the data server in operation 1306. The data server in FIG. 13 may play the role of the control server at the same time. Upon determining the accident, the UE in the vehicle may transmit or report a discovery signal or data to the nearby vehicles using direct communication at the same time with operation 1306, in operation 1308. It will be assumed herein that the UE has transmitted or reported a discovery signal or data to, for example, the UE A in the nearby vehicle. In this situation, the inefficient use of resources and the half-duplexing problem may cause a fatal error, so the resource collision avoidance method proposed in the present disclosure may be used.

Upon receiving the report on the abnormal situation from the UE, the UE A in the nearby vehicle may analyze a code or a message and determine a collision possibility using speed and acceleration information in the OBD information, and map information received from the data server, in operation 1310. If there is a collision possibility, the UE A may perform emergency braking using the control region in operation 1314. In operation 1318, the UE A may broadcast once again the abnormal situation to the surroundings by adding a relay indication to the message. In this manner, it is possible to prevent another additional collision, and the resource collision avoidance scheme proposed may be used.

In order to obtain more information, after receiving the abnormal situation report in operation 1306, the data server may send an information upload request to vehicles around the accident vehicle in operation 1312. The information requested to be uploaded may include, for example, black box information, OBD information and the like. Upon receiving the request, the nearby UEs may upload the black box video to the data server in operation 1316. Operations 1312 and 1316 may be performed any time after operation 1306.

The data server that performs the data server operation and the control server operation at the same time may notify the accident to the UE B in order to prevent an additional accident of the UE B that is a little further away from the accident location, and may perform traction control if necessary, in operation 1320. The traction control may be released by the user's action. Upon receiving information about another abnormal situation from the UE, the data server may perform traction control based on the speed of the preceding vehicle and the map. The UE B may prevent additional damage by broadcasting the UE B's own status to the surroundings in the traction control situation in operation 1322. Operation 1322 may be performed by the data server or another application server that has received information from the data server.

Finally, for the UE C in the vehicle that may undergo indirect damages such as traffic jam even though the UE C is not likely to undergo direct collision damage as the vehicle is far away from the accident location, the data server that performs the data server operation and the control server operation at the same time may analyze the vehicle map information and the destination entered into the navigation terminal, and reset the optimal path (or routing) in consideration of the traffic congestion of the roads in operations 1324 and 1326. Operations 1324 and 1326 may be performed by the data server that performs the data server operation and the control server operation at the same time, or another application server that has received information from the data server.

As is apparent from the foregoing description, the present disclosure may prevent the SA collision in the mobile communication system.

In addition, the present disclosure may solve the half-duplexing problem in the mobile communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for avoiding resource collision by a first user equipment (UE) in a mobile communication system, the method comprising:

receiving, by the first UE, scheduling assign (SA) information of a second UE, the SA information including information associated with an interest identifier (ID) of the second UE; and selecting, based on the SA information, a first resource for the first UE, the first resource being different from a second resource selected for the second UE,
wherein the interest ID includes group ID or individual ID associated with an interest of the second UE.

2. The method of claim 1, wherein the SA information includes at least one of a resource pattern or index, priority information of a UE or subscriber, quality of service (QoS) class of data to be transmitted, a location, and an SA count.

3. The method of claim 2, wherein when the location indicates that the UE is in coverage, the UE acquires a transmission location of the SA information from an evolved Node B (eNB).

4. The method of claim 2, wherein if the location indicates that the UE is out of coverage, the UE acquires SA information of another UE, and determine a transmission location of the SA information of the other UE and a data transmission index.

5. The method of claim 2, further comprising:
when the second UE occupies resources and the first UE has entered a new network, receiving, by the first UE, the SA information from the second UE;
determining whether a user priority is high or low;
when the user priority is high, avoiding resources; and
when the user priority is equal or low, determining whether the interest ID matches.

6. The method of claim 5, further comprising:
when the interest ID does not match, selecting resources by avoiding a resource region where a collision occurs;
when the interest ID does match, determining whether a SA count value is 0;
if the SA count value is 0, selecting resources without considering resources of the second UE; and
if the SA count value is not 0, selecting resources in consideration of resources of the second UE.

7. The method of claim 6, further comprising:
determining a QoS of the second UE;
when the QoS of the second UE is low, selecting resources without considering resources of the second UE;
when the QoS of the second UE is high, determining whether a data transmission delay function is possible;
if the data transmission delay function is possible, transmitting data in a next cycle without transmitting the data in a device-to-device (D2D) transmission cycle; and
if the data transmission delay function is not possible, selecting resources without considering resources of the second UE.

8. The method of claim 1, wherein the resources for the first UE are distinguished from the resources for the second UE in terms of at least one of a time domain or a frequency domain.

9. The method of claim 1, further comprising:
when the first UE and the second UE occupy resources, changing, by the first UE, to a listen mode in a particular cycle;
receiving the SA information from the second UE;
determining whether a user priority is high or low;
when the user priority is high, selecting resources by avoiding a resource region where a collision occurs; and
when the user priority is equal or low, determining whether an interest ID matches.

10. The method of claim 9, further comprising:
when the interest ID does not match, selecting resources by avoiding a resource region where a collision occurs;

when the interest ID does matches, determining whether a SA count value is 0;
if the SA count value is 0, selecting resources without considering resources of the second UE; and
if the SA count value is not 0, selecting resources in consideration of resources of the second UE.

11. The method of claim 10, further comprising:
determining a QoS of the second UE;
when the QoS of the second UE is low, selecting resources without considering resources of the second UE;
when the QoS of the second UE is high, determining whether a data transmission delay function is possible;
if the data transmission delay function is possible, transmitting data in a next cycle without transmitting the data in a device-to-device (D2D) transmission cycle; and
if the data transmission delay function is not possible, selecting resources without considering resources of the second UE.

12. An apparatus for avoiding resource collision by a first user equipment (UE) in a mobile communication system, the apparatus comprising:
a controller configured to
receive scheduling assign (SA) information of a second UE, the SA information including information associated with an interest identifier (ID) of the second UE, and
select, based on the SA information, a first resource for the first UE, the first resource being different from a second resource selected for the second UE,
wherein the interest ID includes group ID or individual ID associated with an interest of the second UE.

13. The apparatus of claim 12, wherein the SA information includes at least one of a resource pattern or index, priority information of a UE or subscriber, quality of service (QoS) class of data to be transmitted, a location, and an SA count.

14. The apparatus of claim 13, wherein when the location indicates that the UE is in coverage, the controller is configured to acquire a transmission location of the SA information from an evolved Node B (eNB).

15. The apparatus of claim 13, wherein when the location indicates that the UE is in coverage, the controller is configured to acquire SA information of another UE, and determine a transmission location of the SA information of the other UE and a data transmission index.

16. The apparatus of claim 12, wherein the resources for the first UE are distinguished from the resources for the second UE in terms of at least one of a time domain or a frequency domain.

17. The apparatus of claim 12, wherein when the second UE occupies resources and the first UE has entered a new network, the controller is configured to:
receive the SA information from the second UE; determine whether a user priority is high or low;
when the user priority is high, avoid resources; and
when the user priority is equal or low, determine whether the interest ID matches.

18. The apparatus of claim 17, wherein the controller is configured to:
when the interest ID does not match, select resources by avoiding a resource region where a collision occurs;
when the interest ID does matches, determine whether a SA count value is 0;
if the SA count value is 0, select resources without considering resources of the second UE; and if the SA count value is not 0, select resources in consideration of resources of the second UE.

19. The apparatus of claim 18, wherein the controller is configured to:
determine a QoS of the second UE;
when the QoS of the second UE is low, select resources without considering resources of the second UE;
when the QoS of the second UE is high, determine whether a data transmission delay function is possible;
if the data transmission delay function is possible, transmit data in a next cycle without transmitting the data in a device-to-device (D2D) transmission cycle; and
if the data transmission delay function is not possible, select resources without considering resources of the second UE.

20. The apparatus of claim 12, wherein when the first UE and the second UE occupy resources, the controller is configured to:
change to a listen mode in a particular cycle;
receive the SA information from the second UE;
determine whether a user priority is high or low;
when the user priority is high, select resources by avoiding a resource region where a collision occurs; and
when the user priority is equal or low, determining whether an interest ID matches.

21. The apparatus of claim 20, wherein the controller is configured to:
when the interest ID does not match, select resources by avoiding a resource region where a collision occurs;
when the interest ID does matches, determine whether a SA count value is 0;
if the SA count value is 0, select resources without considering resources of the second UE; and
if the SA count value is not 0, select resources in consideration of resources of the second UE.

22. The apparatus of claim 21, wherein the controller is configured to:
determine a QoS of the second UE;
when the QoS of the second UE is low, select resources without considering resources of the second UE;
when the QoS of the second UE is high, determine whether a data transmission delay function is possible;
if the data transmission delay function is possible, transmit data in a next cycle without transmitting the data in a device-to-device (D2D) transmission cycle; and
if the data transmission delay function is not possible, select resources without considering resources of the second UE.

* * * * *